Jan. 18, 1955 — I. TRAUTMAN — 2,699,811
PNEUMATIC TIRE
Filed Dec. 20, 1951
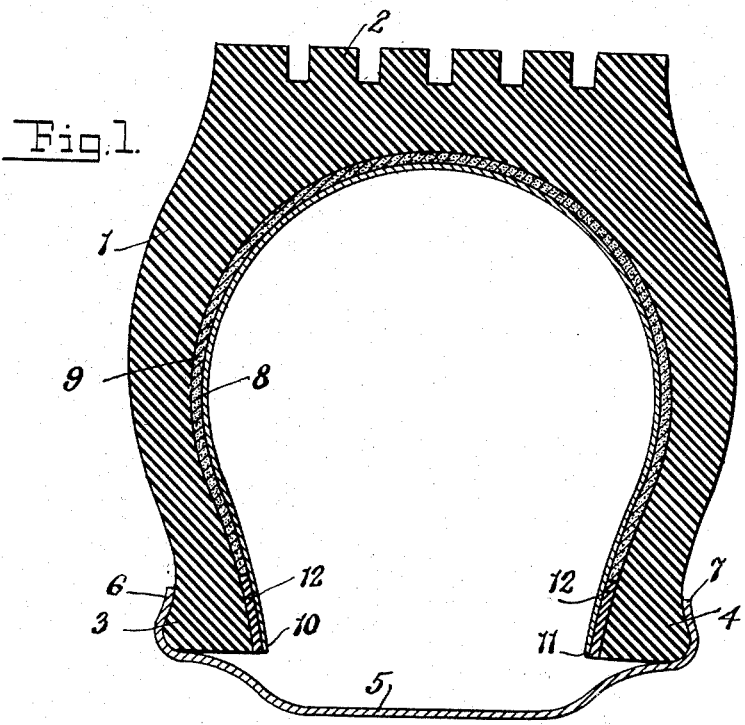
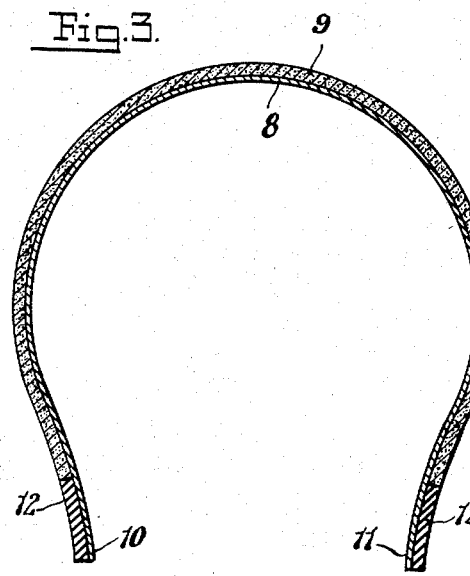
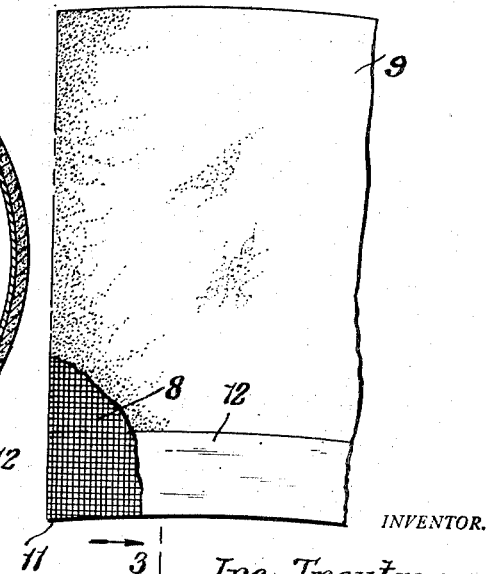
INVENTOR.
Ira Trautman
BY Harry Radzinsky
ATTORNEY

United States Patent Office 2,699,811
Patented Jan. 18, 1955

2,699,811

PNEUMATIC TIRE

Ira Trautman, Wyandanch, N. Y., assignor of one-half to William Kubach, Islip, N. Y.

Application December 20, 1951, Serial No. 262,607

1 Claim. (Cl. 152—364)

This invention relates to pneumatic tires of the type particularly adapted for use upon automobiles or other automotive vehicles. One of the objects of the invention is to provide a so-called "tubeless" tire having numerous advantages, such as being blow-out proof, puncture-resistant, light in weight, easy to change, and having easy riding characteristics.

At the present time, efforts are being made to popularize tires of the so-called "tubeless" tube and which usually consist of a conventional tire, or casing or shoe, fitted to the rim, with the air maintained directly with an air chamber made up of the tire and the rim of the vehicle on which the tire is fitted. The success attained in maintaining air within a tire of such construction is largely dependent upon the securement of an airtight joint between the bead of the tire and the rim. Such an airtight joint is difficult to secure due to the fact that the rim often possesses irregularities, such as rivets, or indentations caused by the forcible contact of the rim with curbs or other obstructions. Hence the mere placement of a tire shoe or casing on a rim and an attempt to maintain air pressure between the shoe and rim, and without the use of an inner tube is likely in many cases, to prove unsatisfactory. It is therefore an object of the present invention to provide a tire which will be composed of a shoe or casing which will be provided with a connecting strip extending across the space between the beads of the shoe to thereby cooperate with the shoe in forming a closed chamber, and without requiring the use of the rim as an element of such chamber.

It is another object of the invention to "puncture-proof" such a type of tire by the employment of an improved type of liner within the casing and secured to the inside face of the same. Such liner shall consist of a strip of fabric having a facing composed of uncured, oil-softened rubber or similar material, which shall be self-sealing to thereby tend to close any puncture which may take place.

It is another object of the invention to provide an improved method of manufacturing a tubeless tire of this character by means of which a puncture-proof lining will be provided within the tire and thereby greatly increase the factor of safety to the automobilist.

These and other objects are attained by the invention, a more particular description of which will hereinafter appear and be set forth in the claim appended hereto.

In the accompanying drawing, wherein an illustrative embodiment of the invention is disclosed, Fig. 1 is a cross-sectional view of a tire constructed in accordance with the invention;

Fig. 2 is a side elevation of a section of the improved liner; and

Fig. 3 is a cross-sectional view through the liner, taken on the line 3—3 of Fig. 2, looking in the direction of the arrows.

Referring to the drawing, 1 indicates a tire shoe or so-called "casing" of the conventional type used for automotive work. While for the purpose of simplicity in illustration, the tire or shoe is shown of single-piece construction and made of rubber or synthetic rubber, it will be understood that the same may be fabric or cord-reinforced in any of the known ways. To aid in making a tire of this character puncture-resistant, it might be found desirable to manufacture the same in the manner suggested in my Patent No. 1,842,219. That is to say, the casing or shoe when placed in the mold and vulcanized, is in a reversed position with the treads 2 then located on the inside or concave face of the tire. After being properly vulcanized and removed from the mold, the tire is then reversed or turned inside out, bringing the tread 2 to the outside of the tire. This procedure causes the rubber of the tire to be placed under compression, and a tendency to seal any puncture is then present. While the shoe or casing can be made as just described, the same can, if desired, be made in the customary manner.

The tire is further made puncture-resistant by the employment of a liner of novel construction secured on the inside of the casing or shoe. Such liner is composed of a fabric strip to which is applied on its outer surface a coating or facing 9 of uncured rubber which has been oil-treated to permanently maintain it in a soft and tacky condition and render it self-sealing. That is to say, a puncture caused in this layer or coating 9 will be at once closed because of the nature of the coating. The coating of oil-softened uncured rubber 9 extends over the greater portion of the outer surface of the fabric strip 8, except along the marginal edges 10 and 11. It will be noted that the edges 10 and 11 of the strip 8 terminate adjacent to the beads 3 and 4 of the shoe. Along said edges there is applied, on the outside face of the strip 8, strips of cured rubber 12.

In applying the liner to the inside of the casing or shoe, it is applied as shown in Fig. 1, wherein it will be seen that the liner closely conforms to the inside surfaces of the shoe and is arranged with the coating or layer 9 outermost, or disposed between the fabric strip 8 and the inside face of the casing or shoe. Thus there is interposed between the inside face of the casing or shoe, and the fabric strip 8, a layer of soft, self-sealing, uncured, oil-softened rubber tending to at once seal any puncture.

When the liner is positioned in the manner shown in Fig. 1, it is then attached to the inside of the casing or shoe by vulcanizing the cured rubber edge strips 12 to the shoe so that the liner then becomes for all intents and purposes a part of the shoe and attached thereto solely by the vulcanization of the elements 11 to the shoe.

Since the improved tire is to be a tubeless one, it has its conventional beads 3 and 4 connected by an apron 5 which has its opposite side portions, shown respectively at 6 and 7, secured to the outer side surfaces of the beads 3 and 4. These edge portions of the apron 5 may be vulcanized or otherwise firmly secured to the edge portions of the shoe.

The apron 5 may be composed of a single thickness of rubber or synthetic rubber or other air-impervious sheet material, or it can probably be best composed of several layers of rubber between which is employed a fabric or cord-reinforcing layer. The apron 5 is relatively thin and flexible so that when the tire is inflated it will closely conform to the inner side of the wheel rim.

The tire valve, not shown, may be carried by the apron 5 and extended through the usual aperture in the rim in the known manner. It will be noted that the apron 5, secured to the two beads 3 and 4 of the tire, will cooperate with the casing or shoe in forming a continuous air chamber composed of the tire or shoe and the attached apron. The tire or shoe is placed on the rim in the usual manner and is retained thereon as usual, but since the apron 5 closes the normally open or inner side of the casing or shoe and produces a closed air chamber, the use of an inner tube is rendered unnecessary. The elimination of the inner tube provides an easier ride; the self-sealing effect provided by the employment of the liner composed of the cooperating parts 8, 9 and 11 results in a puncture-proof tire.

Having described one embodiment of the invention, it is obvious that the same is not to be restricted thereto, but is broad enough to cover all structures coming within the scope of the annexed claim.

What I claim is:

In a tire, a shoe having a liner including a fabric layer and arranged within it and conforming to the interior shape of the shoe, the fabric layer having its opposite edges terminating adjacent to the beads of the shoe, the portions of the fabric layer located adjacent to said edges being secured to attaching-strips of cured rubber, said attaching strips vulcanized to the interior of the shoe adjacent said leads, said fabric layer being free of attachment to the interior of the shoe between said attaching strips, the liner further including an outer coating of oil-treated uncured rubber applied on the outer face of the fabric layer, said coating facing the interior of the shoe and being interposed between the fabric layer and the inner surface of the shoe, said coating extending between the inner edges of the attaching-strips, and being confined between the liner and shoe by the attaching-strips, and a strip of flexible, air-impervious material having its opposite edges fixedly attached to the beads of the shoe and bridging the space between the same.

References Cited in the file of this patent

UNITED STATES PATENTS

| Number | Name | Date |
|---|---|---|
| 876,616 | Zeglen | Jan. 14, 1908 |
| 1,237,698 | Reuter | Aug. 21, 1917 |
| 1,372,284 | Doss | Mar. 22, 1921 |
| 1,827,668 | Musselman | Oct. 13, 1931 |
| 1,886,470 | Daddio | Nov. 8, 1932 |
| 2,120,379 | Taylor et al. | June 14, 1938 |
| 2,193,734 | MacCracken | Mar. 12, 1940 |
| 2,194,341 | Voorhees | Mar. 19, 1940 |
| 2,354,426 | Briant | July 25, 1944 |
| 2,410,209 | Godsey | Oct. 29, 1946 |
| 2,493,047 | Waber | Jan. 3, 1950 |
| 2,537,107 | Waber | Jan. 9, 1951 |
| 2,608,235 | Wyman | Aug. 26, 1952 |